(12) United States Patent
Sung et al.

(10) Patent No.: US 9,285,770 B2
(45) Date of Patent: Mar. 15, 2016

(54) HOLOGRAPHIC DISPLAY DEVICE AND METHOD FOR GENERATING HOLOGRAM USING REDUNDANCY OF 3D VIDEO

(71) Applicant: LG ELECTRONICS INC., Seoul (KR)

(72) Inventors: Jaewon Sung, Seoul (KR); Moonmo Koo, Seoul (KR); Sehoon Yea, Seoul (KR)

(73) Assignee: LG Electronics Inc., Seoul (KR)

( * ) Notice: Subject to any disclaimer, the term of this patent is extended or adjusted under 35 U.S.C. 154(b) by 466 days.

(21) Appl. No.: 13/772,946

(22) Filed: Feb. 21, 2013

(65) Prior Publication Data

US 2013/0222874 A1 Aug. 29, 2013

(30) Foreign Application Priority Data

Feb. 29, 2012 (KR) .................. 10-2012-0021325

(51) Int. Cl.
*G03H 1/08* (2006.01)
(52) U.S. Cl.
CPC .......... *G03H 1/08* (2013.01); *G03H 2001/0816* (2013.01); *G03H 2001/0825* (2013.01); *G03H 2001/0833* (2013.01)
(58) Field of Classification Search
CPC .............................................. G03H 2001/0088
See application file for complete search history.

(56) References Cited

U.S. PATENT DOCUMENTS

| 2008/0259419 | A1 | 10/2008 | Wilson et al. |
| 2009/0096783 | A1* | 4/2009 | Shpunt et al. ................ 345/419 |
| 2011/0310447 | A1 | 12/2011 | Kim et al. |
| 2011/0310448 | A1 | 12/2011 | Kim et al. |
| 2011/0310449 | A1 | 12/2011 | Kim et al. |
| 2015/0036199 | A1 | 2/2015 | Leister et al. |

FOREIGN PATENT DOCUMENTS

| CN | 101088053 A | 12/2007 |
| CN | 101452581 A | 6/2009 |
| EP | 0 862 096 A2 | 9/1998 |

* cited by examiner

*Primary Examiner* — Jennifer L. Doak
(74) *Attorney, Agent, or Firm* — Birch, Stewart, Kolasch & Birch, LLP

(57) ABSTRACT

A holographic display device and method of generating a hologram using redundancy of 3D video are disclosed. A storage unit stores the hologram of a previous 3D image frame. A control unit generates an update map indicating an update required 3D point among 3D points included in a current 3D image frame based on the current 3D image frame and the previous 3D image frame and modifies the update map to further include information indicating the update of a 3D point related to the update required.

19 Claims, 14 Drawing Sheets

HOLOGRAPHIC DISPLAY DEVICE AND METHOD FOR GENERATING HOLOGRAM USING REDUNDANCY OF 3D VIDEO

This application claims the benefit of the Korean Patent Application No. 10-2012-0021325, filed on Feb. 29, 2012, which is hereby incorporated by reference as if fully set forth herein.

BACKGROUND OF THE INVENTION

1. Field of the Invention

The present invention relates to a holographic display device and method for generating a hologram using redundancy of 3D video, and more particularly, to a holographic display device for generating a computer generated hologram (CGH) in consideration of redundancy of 3D video and a method for generating a hologram using redundancy of 3D video.

2. Discussion of the Related Art

Generally, computer generated hologram (CGH) can be classified into a calculation method attributed to a ray tracing method, a calculation method using a look-up table (LUT), a fast fourier transform applied method and the like. And, the CGH can also be classified into a method of general hologram having a wide viewing angle and a method of sub-hologram having a limited viewing angle. The look-up table can also be used in calculating a sub-hologram, thereby considerably enhancing computing speed.

In generating a general hologram according to a related art, there is an enhanced result of 26 times faster computing speed using a parallel processing machine which is called CM2 in a thesis of M. Lucente. "interactive computation of holograms using a look-up table" (1993), which enabled a speed to be upgraded by using a look-up table algorithm and there is another enhanced result of about 70 times faster computing speed implemented in a system operable in a general PC using Matlab programming language in a thesis of Seung-Cheol Kim, "effective generation of digital holograms of three-dimensional objects using a novel look-up table method" (2008).

Even today, in case of calculating a CGH using such a fast parallel computing solution as a graphics processing unit (GPU), a study for real-time implementation of CGH calculation capacity using look-up tables has been globally conducted.

Regarding a CGH generation using a sub-hologram method, the amount of the basically used LUT becomes considerably less than that of a general hologram. In case of a general hologram, assuming that the general hologram has a resolution of 1920*1080 and that a sub-hologram forms an observation window for an observer in 2 meters, if an object point located 1 meter away from a hologram has an LUT of resolution corresponding to a size of the observation window, it is able to represent one identical object point.

An observation window is configured in the size of 6 to 12 mm, which is little bit bigger than that of a pupil of the eye of an ordinary man. If it is converted by pixel unit, when a pixel size is 156 μm, it is possible to configure an LUT to have about 76*76 resolution. Compared to a general hologram, a sub-hologram sets a limit on an eye scope in which an observer can see things. Yet, in case of using LUT, the sub-hologram has an advantage in configuring the LUT in size considerably smaller than that of the LUT used in a conventional general hologram. Utilizing this, it facilitated to configure a sub-hologram based real-time hologram display system. VISIO 20 prototype launched at SID in 2007 by SeeReal company was able to demonstrate a real-time hologram with limited hardware capability (GPU: NVIDIA 7900 GTX).

Naturally, if hardware is designed with high specifications, real-time holograms can be generated without using a display look-up table. However, the utilization of the look-up table for a solution capable of generating a real-time hologram with the configuration of low hardware specifications can be very effective.

SUMMARY OF THE INVENTION

Accordingly, embodiments of the present invention are directed to a holographic display device and method for generating a hologram using redundancy of 3D video that substantially obviate one or more problems due to limitations and disadvantages of the related art.

An object of the present invention is to provide a holographic display device and method for generating a hologram using redundancy of 3D video, by which a phantom image effect can be prevented from occurring in case of generating the hologram using the redundancy of 3D video.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of generating a hologram using redundancy of 3D video according to the present invention may include the steps of generating an update map indicating an update required 3D point among 3D points contained in a current 3D image frame based on the current 3D image frame and a previous 3D image frame, modifying the update map to further contain information indicating an update of a 3D point related to the update required 3D point, and generating the hologram of the current 3D image frame based on the modified update map.

Preferably, the related 3D point includes a 3D point causing a phantom image due to the update required 3D point.

Preferably, the related 3D point includes a 3D point blocked by the update required 3D point.

Preferably, the related 3D point is situated within a prescribed distance from the update required 3D point.

Preferably, the related 3D point is situated within a prescribed pixel distance from a position of the update required 3D point.

Preferably, generating the hologram includes the steps of checking whether a percentage of the update required 3D point exceeds a preset percentage using the generated update map, modifying the hologram of the previous 3D image frame based on the modified update map if the percentage of the update required 3D point does not exceed the preset percentage, and outputting the modified hologram as the hologram of the current 3D image frame.

More preferably, generating the hologram further includes the step of newly generating the hologram of the current 3D image frame if the percentage of the update required 3D point exceeds the preset percentage.

Preferably, modifying the update map includes the steps of determining a pixel distance to determine the related 3D point and modifying the update map by performing a dilation operation on the generated update map using a mask having a radius set to the determined pixel distance.

Preferably, modifying the update map includes the steps of determining a pixel distance to determine the related 3D point, checking whether a point having a changed value between two neighboring pixels in the generated update map exists, and if the changed point exists, modifying information included in a pixel within a determined pixel distance from a pixel including the 3D point update indicating information of the two neighboring pixels into the 3D point update indicating information.

To achieve these objects and other advantages and in accordance with the purpose of the invention, as embodied and broadly described herein, a holographic display device according to the present invention may include a storage unit configured to store a hologram of a previous 3D image frame and a control unit generating an update map indicating an update required 3D point among 3D points contained in a current 3D image frame based on the current 3D image frame and a previous 3D image frame, the control unit modifying the update map to further include information indicating an update of a 3D point related to the update required 3D point, the control unit generating the hologram of the current 3D image frame based on the modified update map.

Preferably, the holographic display device further includes a display unit configured to display the hologram of the current 3D image frame.

More preferably, the display unit includes a spatial light modulator representing an interference fringe and a light source applying a light to the spatial light modulator.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
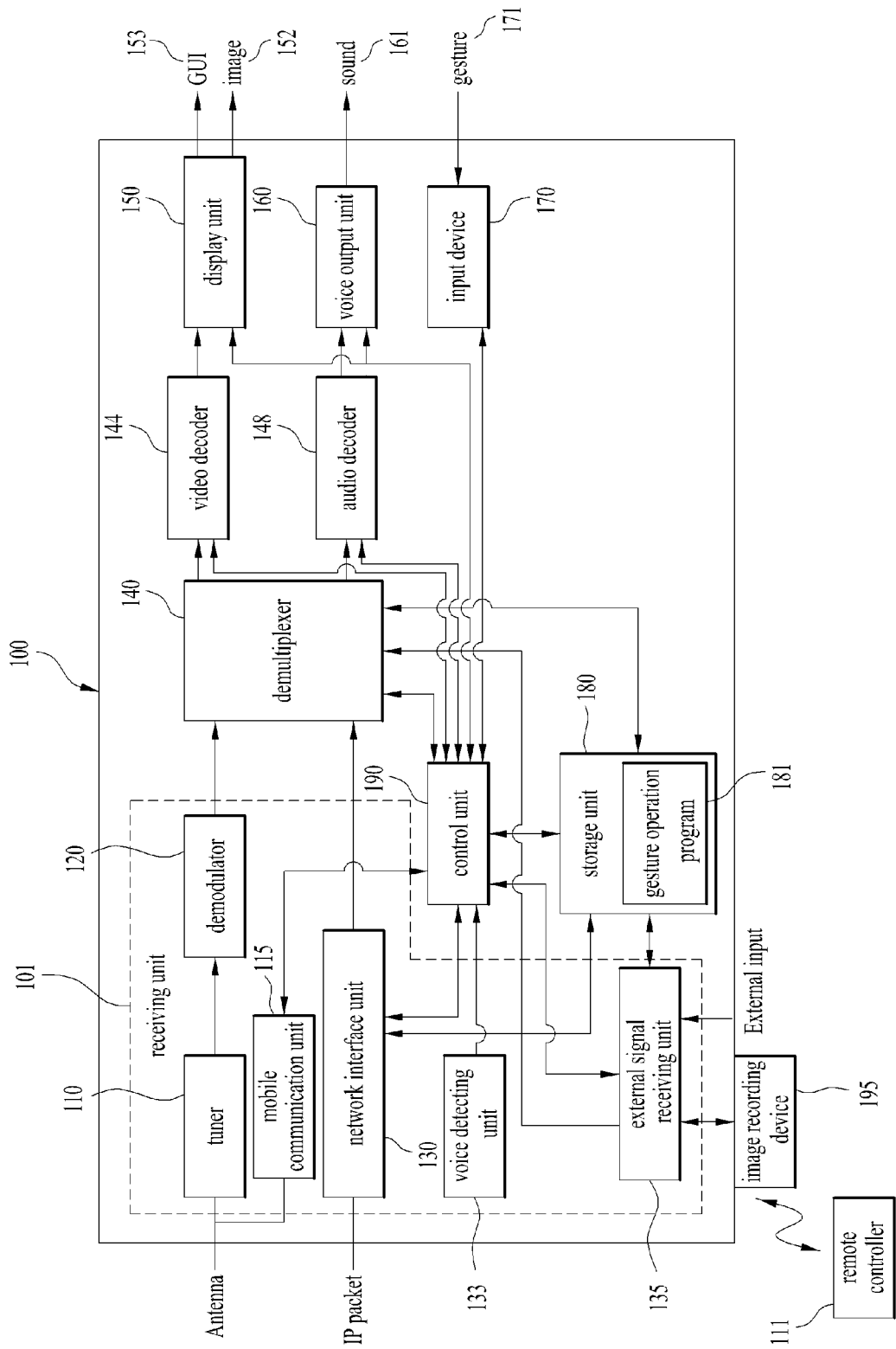
FIG. 1 is a diagram for a configuration of a holographic display device according to one preferred embodiment of the present invention.

Reference will now be made in detail to the preferred embodiments of the present invention, examples of which are illustrated in the accompanying drawings. In this case, some configurations or actions of the present invention depicted in the drawings and described through the drawings are explained as at least one embodiment, by which technical ideas and its core configuration and action of the present invention may be non-limited.

Although terminologies used in the present specification are selected from general terminologies used currently and widely in consideration of functions in the present invention, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the invention. Therefore, terminologies used in the present specification need to be construed based on the substantial meanings of the corresponding terminologies and the overall matters disclosed in the present specification rather than construed as simple names of the terminologies.

Moreover, specific structural/functional descriptions for the embodiments in accordance with the concept of the present invention disclosed in the present specification are only exemplified for the purpose of explaining the embodiment according to the present invention. The embodiments according to the concept of the present invention can be implemented in various forms, by which the embodiments of the present invention may be non-limited.

Since the embodiment in accordance with the concept of the present invention may be able to add various modifications and have a plurality of forms, specific embodiments are exemplified in the drawings and will be explained in detail in the present specification. Yet, the embodiment in accordance with the concept of the present invention may be non-limited for a specific disclosing form and should be understood that all modifications and equivalents/substitutes contained in the ideas and technical scope of the present invention are included.

In the present invention, such a terminology as $1^{st}$, $2^{nd}$ and/or the like can be used for explaining various components. Yet the various components should not be limited by the terminologies. The terminologies can be used for the purpose of distinguishing one component from another component. For instance, a $1^{st}$ component may be named a $2^{nd}$ component or the $2^{nd}$ component may be named the $1^{st}$ component, provided they come within the scope of the appended claims and their equivalents.

FIG. 1 is a diagram for a configuration of a holographic display device according to one preferred embodiment of the present invention.

Referring to FIG. 1, a holographic display device 100 according to the present invention may include at least one of a receiving unit 101, a demultiplexer 140, a video decoder 144, an audio decoder 148, a display unit 150, an audio output unit 160, an input device 170, a storage unit 180 and a control unit 190. The holographic display device 100 may further include an image recording device 195 depending on an embodiment.

For instance, the holographic display device 100 is an intelligent display device having a computer-aided function added to a broadcast receiving function. And, the holographic display device 100 may be equipped with such an easy-to-use interface as a handwritten input device, a touch screen, a touchpad, a magic remote controller and the like in a manner of having an additional internet function while faithful to the broadcast receiving function. And the holographic display device 100 may be able to perform such a function as e-mail, web-browsing, banking, game and the like in a manner of being connected to internet and computer with the support of a wire/wireless internet function. For these various functions, a standardized universal operating system (OS) can be used. For instance, since various applications can be freely added or deleted on a general purpose OS kernel, various user-friendly functions can be performed. In particular, for instance, the holographic display device 100 may include one of a network TV, a hybrid broadcast broadband TV (HBBTV), a smart TV, an open hybrid TV (OHTV) and or the like. In some cases, the holographic display device 100 can be applied to a smart phone, a personal computer (PC), or an appliance as well.

The receiving unit 101 may be able to receive broadcast data, image data, audio data, information data and application data. The image data may include the data for displaying a 2D image or a 3D image. And the 3D image may include at least one of a hologram and a stereo image. The hologram may include a computer-generated hologram (CGH).

The 3D image may include 3D video having a plurality of 3D image frames. As a part of an embodiment, the 3D image frame may include a 2D image frame having a specific width and area and a corresponding depth image. In this case, the 2D image frame includes a color image data. The color image data includes a pixel value. In the following description, the 2D image frame is named a color image. The depth image can be represented as a grey level and have the same resolution of the pixel resolution of the 2D image frame. The pixels included in the depth image may have depth values one-to-one corresponding to the pixels included in the 2D image frame, respectively. The depth value can be represented as a grey level. As an example, the grey level may have values ranging from 0 to 255.

The holographic display device 100 may be able to calculate a position in a 3D space (X, Y, Z) corresponding to one pixel of a 2D image frame using a pixel value (u, v) of a pixel situated at the coordinates (u, v) of a depth image. X is a coordinate value on X axis in the 2D image frame of the pixel corresponding to the position (X, Y, Z) and Y is a coordinate value on Y axis in the 2D image frame of the pixel corresponding to the position (X, Y, Z). As a part of an embodiment, the holographic display device 100 is able to calculate a depth value Z using Equation 1 as follows. In this case, the depth value Z may indicate a coordinate value on Z axis.

$$Z=Zn+D(u,v)/255*(Zf-Zn) \quad \text{[Equation 1]}$$

In this case, Zn may indicate a depth value (a coordinate value on Z axis) of a foreground that is nearest to a hologram image side among the depth values of a 3D expression area. Zf may indicate a depth value (a coordinate value on Z axis) of a background that is farthest to a hologram image side among the depth values of a 3D expression area. The grey level is assumed as ranging between 0 and 255. And the 3D expression area means a spatial area representing a 3D scene, which is reconstructed into holograms. The depth value of the 3D expression area can be defined by an absolute value (|Zf−Zn|) of a difference value between the depth value (Zf) of the background of the 3D expression area and the depth value (Zn) of the foreground of the 3D expression area.

Equation 1 can be modified depending on a method for the holographic display device 100 to generate a depth image data.

The receiving unit 101 may include a tuner 110, a demodulator 120, a mobile communication unit 115, a network interface unit 130, a voice detecting unit 133, and an external signal receiving unit 135. The tuner 110 receives a stream signal including data via a broadcasting network and the demodulator 120 demodulates the received stream signal. The mobile communication unit 115 may receive data via such a mobile communication network as 2 G communication network, 3 G communication network, 4 G communication network and the like. And, the network interface unit 130 may transceive data via a network and the external signal receiving unit 135 may receive applications and contents from external devices and receive an image frame from the image recording device 195. In this case, the image frame may include a user-photographed image frame.

The demultiplexer 140 demultiplexes the stream signal outputted by the demodulator 120 into a video signal and an audio signal. And, the demultiplexer 140 may receive image data, audio data, broadcast data, information data and application data from the mobile communication unit 115, the network interface unit 130, or the external signal receiving unit 135.

The video decoder 144 decodes video signals demultiplexed by the demultiplexer 140 and outputs the decoded video signals to the display unit 150.

The audio decoder 148 decodes audio signals demultiplexed by the demultiplexer 140 and outputs the decoded audio signals to the audio output unit 160.

The display unit 150 displays an image 152. The image 152 may include a hologram. The display unit 150 may include a spatial light modulator (SLM) configured to display an interference fringe of the hologram and may include such an optical device for imaging the interference fringe displayed by the spatial light modulator as a lens, a mirror and the like.

The spatial light modulator (SLM) modulates a light spatially. The spatial light modulator may include a device for controlling strength, color and/or phase in a manner of switching, blanking or modulating beams of one or more independent sources of lights. The spatial light modulator includes a matrix of controllable pixels and the pixels reconstruct the object points by changing amplitude and/or phase of the passing light. For instance, the spatial light modulator may be implemented discretely or consecutively as an acousto-optic modulator (AOM) and may include a liquid crystal display (LCD).

The spatial light modulator displays the interference fringes in accordance with hologram values of the hologram generated by the control unit 190. A light causing the interference fringes displayed by the spatial light modulator propagates in front of user's eyes and may be then able to reconstruct a 3D scene (hereinafter abbreviated a scene). The scene can be seen in a manner of being reconstructed from a visibility range situated in a periodical interval of the hologram reconstruction. The visibility range is a limited range in which a user is able to see the whole reconstructed scene with sufficiently good visibility. Wave fields in the visibility range overlap with each other to enable the reconstructed scene to become visible to the user. The visibility range may be located in or nearby the eyes of the user. The visibility range may be shifted in directions of X, Y, and Z and track a user's position by a public-known position detecting or tracking method. Using 2 visibility ranges, i.e., using one visibility range per eye is possible. And, it is possible to perform coding to enable an observer to sense individual objects or a whole scene as if the individual objects or the whole scene is located in rear of the spatial light modulator.

In the following description, each of the points configuring the reconstructed 3D scene is defined as a 3D point or an object point.

The display unit 150 may be able to operate in a manner of being connected to the control unit 190. The display unit 150 may be able to display a graphic user interface (GUI) 153 that provide an easy-to-use interface between a user of the holographic display device and an operating system or between applications which are active in the operating system.

The audio output unit 160 receives audio data from the audio decoder 148 and the control unit 190 and may be then able to output a sound 161 generated from the received audio data.

The input device 170 may include a touch screen provided onto or in front of the display unit 150 or a communication unit configured to receive signals from the remote controller 111. The input device 170 may be able to receive a remote controller transmitted signal from the remote controller 111.

According to a part of the embodiment, the receiving unit 101 may include a communication unit configured to receive signals from the remote controller 111. In particular, the external signal receiving unit 135 is able to receive a remote controller transmitted signal from the remote controller 111.

The storage unit 180 provides a place for storing program codes and data used by the holographic display device 100 in general. In this case, the program codes may include the program codes of an application received by the receiving unit 101 or the program codes of an application stored in the course of manufacturing the holographic display device 100. And the applications may be written in such a programming language as HTML, XML, HTML5, CSS, CSS3, Java Script, Java, C language, C++, visual C++, C# and the like.

The storage unit 180 may be able to store a fringe pattern calculated in advance in accordance with a distance of 3D point. And the storage unit 180 may be able to store a hologram generated based on a 3D image frame. The storage unit 180 performs a buffering function of temporarily saving the hologram of a 3D image frame previous to a currently displayed 3D image frame. In this case, the storage unit 180 is able to store a hologram value of the hologram. The hologram value may mean a pixel value of hologram-pixel controllable by the spatial light modulator. In case of displaying a color, the hologram-pixel may include a plurality of sub-pixels representing a primary color and the hologram value may include pixel values of a plurality of the sub-pixels. And, the hologram value means a hologram point value of the hologram.

The storage unit 180 can be implemented with at least one of a read-only memory (ROM), a random access memory (RAM), a hard disc drive and the like. The program codes and data can be saved in a removable storing medium or loaded/installed on the holographic display device 100 if necessary. In this case, the removable storing medium may include one of a CD-ROM, a PC-CARD, a memory card, a floppy disc, a magnetic tape, a network component and the like.

The control unit 190 executes a command and performs an operation in association with the holographic display device 100. For instance, the control unit 190 may be able to control the inputs/outputs, data receptions and processings between the components of the holographic display device 100 using the commands retrieved from the storage unit 180.

The control unit 190 performs operations of executing program codes, generating data and using the data together with an operating system. The operating system is generally well known to the public and its details shall not be further described. For instance, the operating system may include one of Windows-series OS, UNIX OS, Linux OS, Palm OS, DOS, Android OS, Macintosh OS and the like. The operating system and other computer codes and data can be saved in the storage unit 180 that operates by being connected to the control unit 190.

The control unit 190 can be implemented on a single chip, a plurality of chips, or a plurality of electronic parts. For instance, a dedicated or embedded processor, a single-purpose processor, a controller, ASIC and/or various architectures can be used for the control unit 190.

The control unit 190 may recognize a user action and may be then able to control the holographic display device 100 based on the recognized user action. In this case, the user action may be able to include one of a selection of a physical button of the holographic display device 100 or the remote controller, a prescribed gesture action or a soft button selection performed on a display side of a touch screen, a prescribed gesture action recognized from an image photographed by the image recording device 195, a prescribed voice making action recognized by voice recognition and the like. The gestures may include a touch gesture and a spatial gesture.

The control unit 190 may be able to configure Pi corresponding to a set of 3D point obtained from the 3D image data of a specific width W and a specific area H, which is received by the receiving unit 101. N 3D point sets can be configured from N (=W*H) pixels configuring the 3D image data. The 3D point set Pi can be defined by Equation 2 as follows.

$$Pi=(Xi,Yi,Zi),(i=1,\ldots,N) \qquad \text{[Equation 2]}$$

The input device 170 receives a gesture 171 and the control unit 190 executes commands for performing operations related to the gesture 171. Moreover, the storage unit 180 may include a gesture operating program 181 which may be an operating system or a part of a separate application. The gesture operating program 181 may include a series of commands for recognizing an occurrence of the gesture 171 and informing at least one software agent of the gesture 171 and/or what kind(s) of action(s) should be taken in response to the gesture 171.

Figure 2:
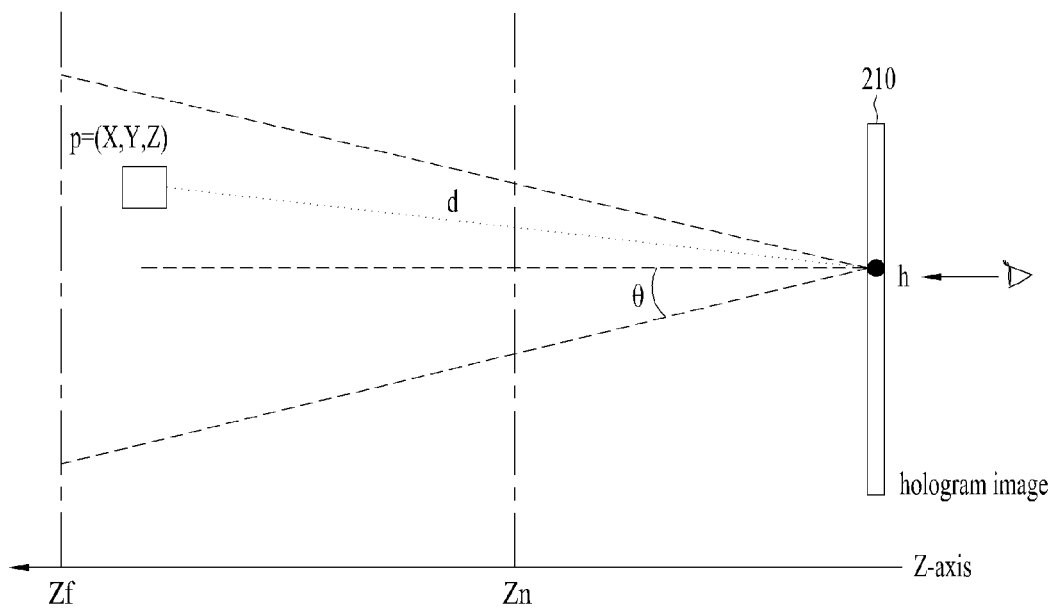
FIG. 2 is a diagram of a 3D point in a 3D expression area in a holographic display device according to the present invention.

FIG. 2 is a diagram of a 3D point in a 3D expression area in a holographic display device according to the present invention.

Referring to FIG. 2, a coordination value Z on a Z axis of 3D point (P (X, Y, Z)) has a value between the coordination value Zn on the Z axis of the foreground of 3D expression area and the coordination value Zf on the Z axis of the background of the 3D expression area.

The control unit 190 calculates a distance between the 3D point and a point (h) for the 3D points, each of which fringe pattern should be recorded on the point (h) of a hologram image side 210. The control unit 190 controls the fringe pattern, which has been calculated in advance according to the calculated distance for the 3D points, to overlap the point (h). The points, each of which fringe pattern should be recorded on the point (h), include the 3D points. In this case, each of the 3D points may have an angle with a straight line, which passes through the point (h) by being vertical to the hologram image side 210, smaller than an angle θ. In this case, the angle θ can be determined by Equation 3 as follows.

$$\theta=\arcsin(\lambda/(2p)) \qquad \text{[Equation 3]}$$

In this case, λ is a wavelength of light used for the playback of the hologram and P is a size of pixel of a panel of the display unit 150. The panel of the display unit 150 may include a spatial light modulator (SLM) and the P may indicate a size of the pixel of the spatial light modulator.

For instance, the control unit 190 calculates a distance (d) between 3D point (P) having a smaller angle with the line vertical to the hologram image side 210 than the angle θ and the point (h) and then controls the fringe pattern, which is calculated in advance according to the calculated distance (d), to overlap the point (h).

The control unit 190 may be able to generate a hologram in a manner of controlling the fringe pattern, which should be recorded on each point of the hologram image side 210, to overlap the each point of the hologram image side 210.

Figure 3:
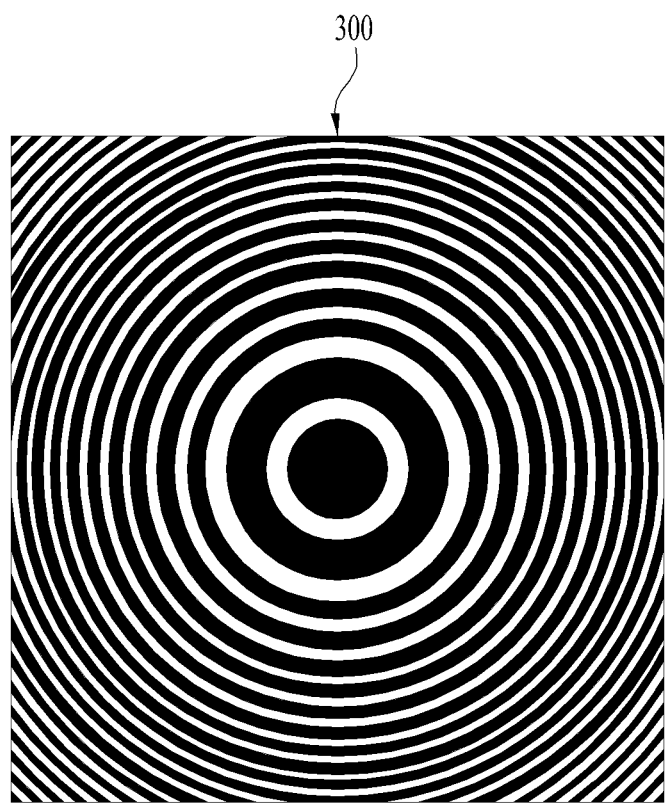
FIG. 3 is a diagram of a fringe pattern for a 3D point.

FIG. 3 is a diagram of a fringe pattern for a 3D point.

Referring to FIG. 3, an image 300 is an example of a fringe pattern corresponding to a point light source. The control unit 190 accesses the fringe pattern 300 based on a distance (d) calculated from the storage unit 180 and controls the accessed fringe pattern 300 to overlap a point (h).

Figure 4:
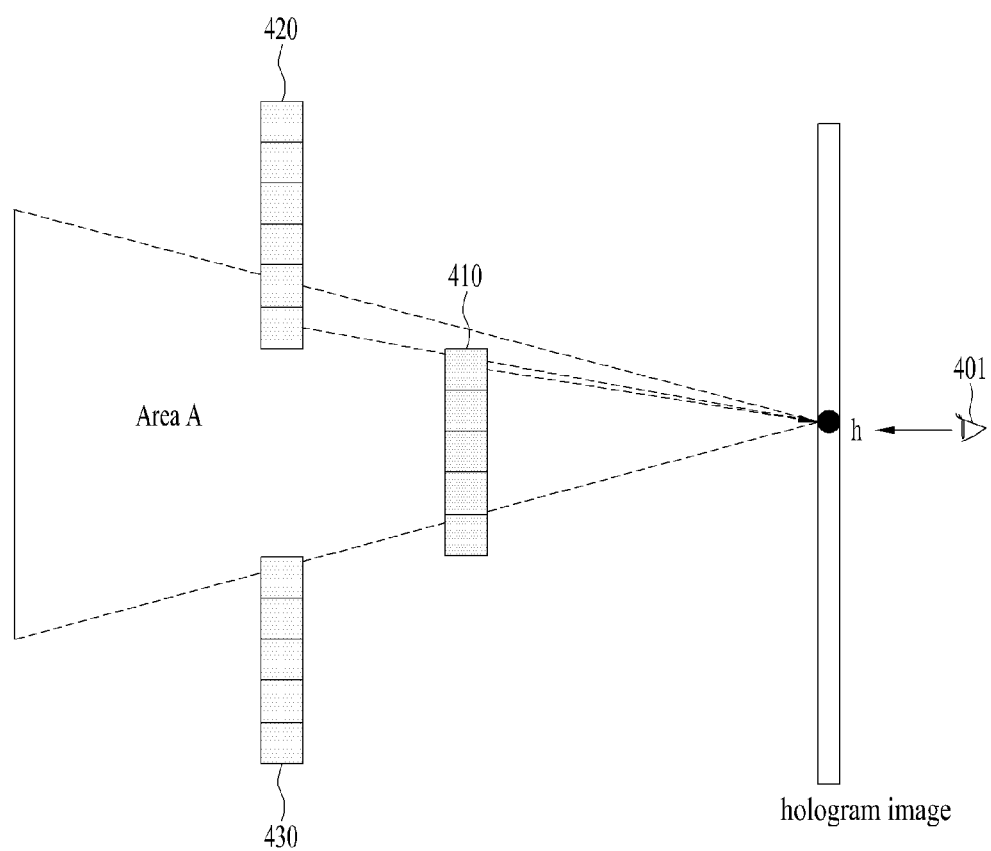
FIG. 4 is a diagram for a phantom image effect.

FIG. 4 is a diagram for a phantom image effect.

Referring to FIG. 4, assume that a user 401 is on the right to see a hologram image on the left. An area, in which 3D points are situated is represented as the area A. In this case, a fringe pattern of the 3D points should be recorded on a point (h). An object 410 closer to the hologram image is called a foreground and another object 420/430 farther from the hologram image is called a background.

In case of generating a hologram image by calculating distances between the point (h) and the 3D points included in the area A and enabling the fringe pattern, which is related to the calculated distances, to overlap the point (h), it may cause a problem that a background image supposed not to be seen by being blocked by a foreground appears. A phenomenon that the background image appears is called a phantom image effect. And, the 3D point causing the phenomenon among the 3D points for configuring the background image shall be defined as a 3D point causing phantom image FIG. 5 is a diagram of a process for generating an update map.

Figure 5:
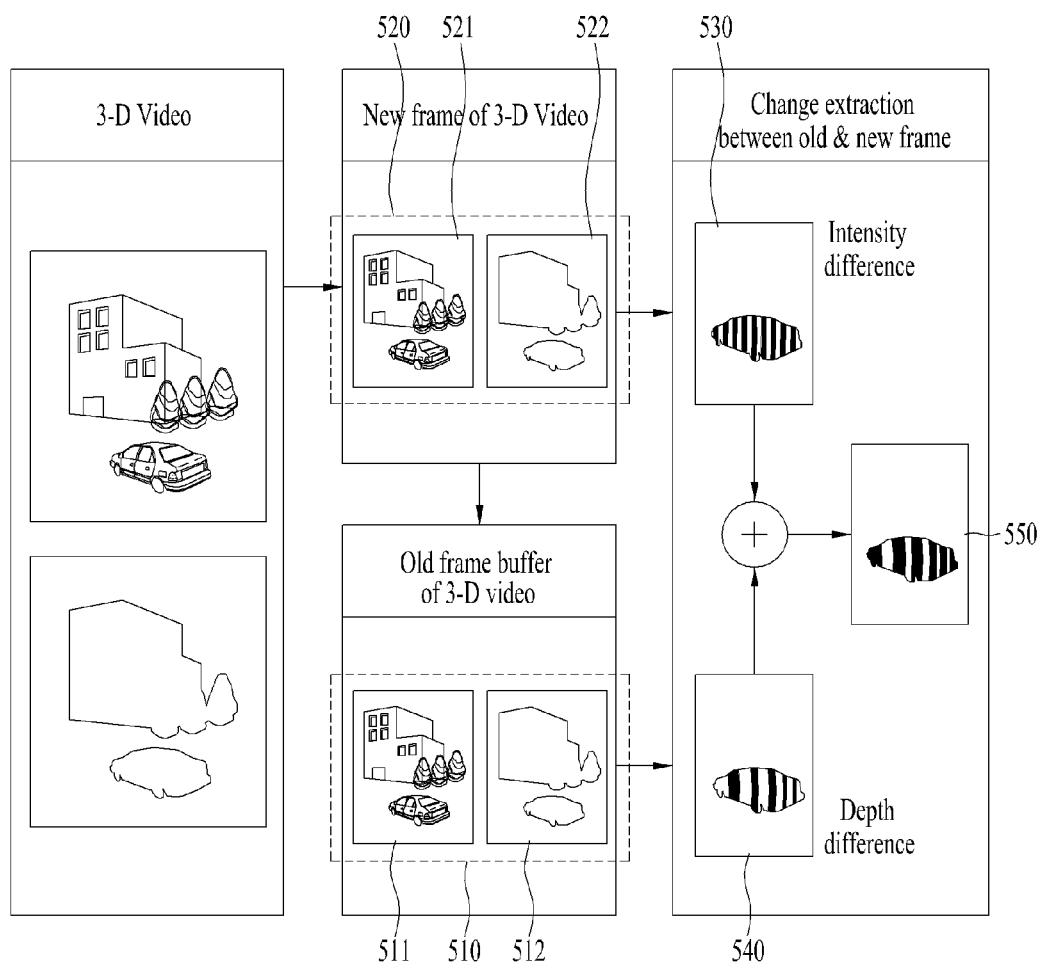
FIG. 5 is a diagram of a process for generating an update map.

Referring to FIG. 5, in case of displaying a 3D video with holograms, the control unit 190 compares a 3D image frame 510 of a previous timing (t−1) with a 3D image frame 520 of a current timing (t) and then calculates 3D points 530 and 540 that have changed. And, the control unit 190 generates an update map indicating that the calculated 3D point 530 needs to be updated.

As a part of an embodiment, the control unit 190 calculates an intensity difference signal 530, which is the difference signal between a color image 511 of a 3D image frame 510 and a color image 521 of a 3D image frame 520. The control unit 190 calculates a depth difference signal 540, which is the difference signal between a depth image 512 of the 3D image frame 510 and a depth image 522 of the 3D image frame 520. The control unit 190 calculates a difference signal 550 resulting from adding the intensity difference signal 530 and the depth difference signal 540 together. The control unit 190 generates an update map representing 3D points. In the update map, the 3D point having a difference value indicated by the difference signal 550 exceed a threshold is set to 1 and the 3D point having the difference value not exceed the threshold is set to 0. In this case, the '1' is the information indicating that the 3D point needs to be updated, whereas the '0' is the information indicating that the 3D point does not need to be updated.

Figure 6:
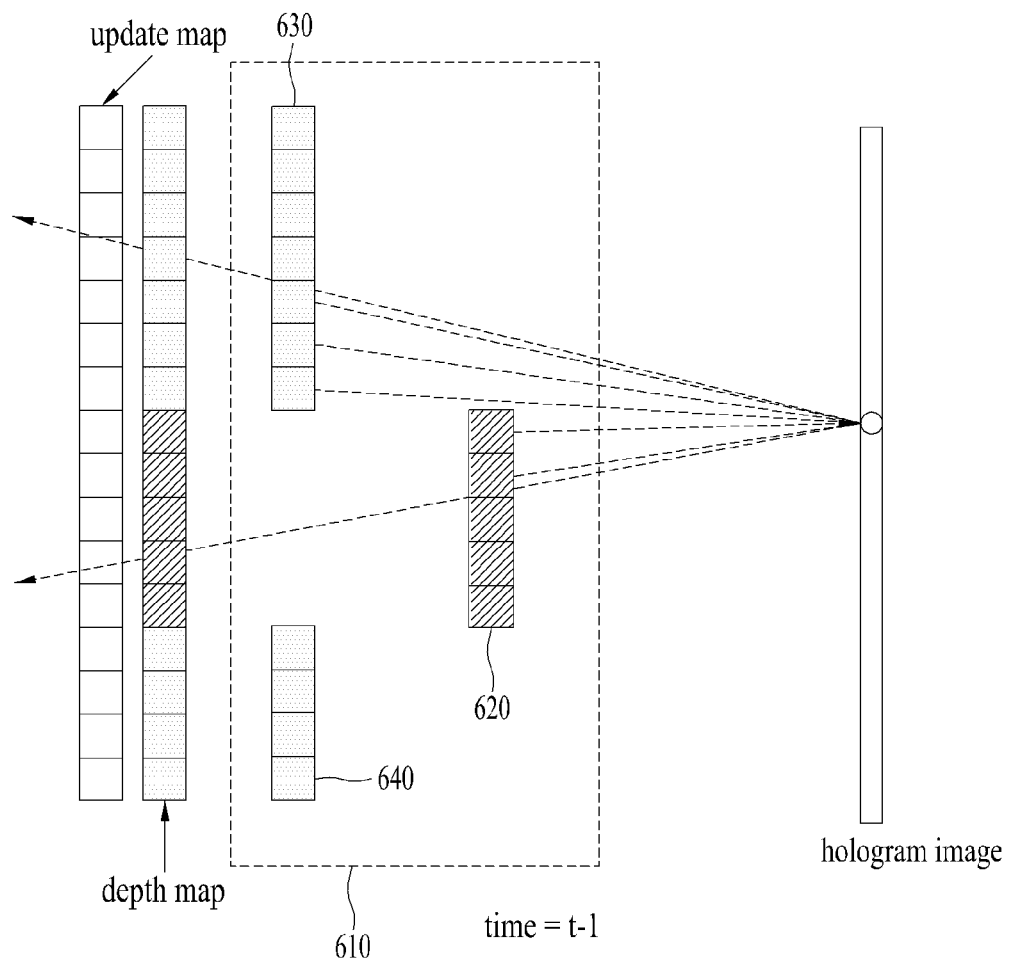
FIG. 6 is a diagram for a situation in which a hologram is synthesized at a previous timing (t−1)

FIG. 6 is a diagram for a situation in which a hologram is synthesized at a previous timing (t−1).

FIG. 6 shows a situation in which a hologram for a 3D image frame at a previous timing (t−1) is synthesized.

In FIG. 6, a depth map having depth information on 3D points recorded therein and an update map indicating whether to update the 3D points are shown. 3D expression area corresponds to a box 610. And, the 3D points 620, 630 and 640 are displayed in the 3D expression area 610 according to the corresponding depth values, respectively.

Figure 7:
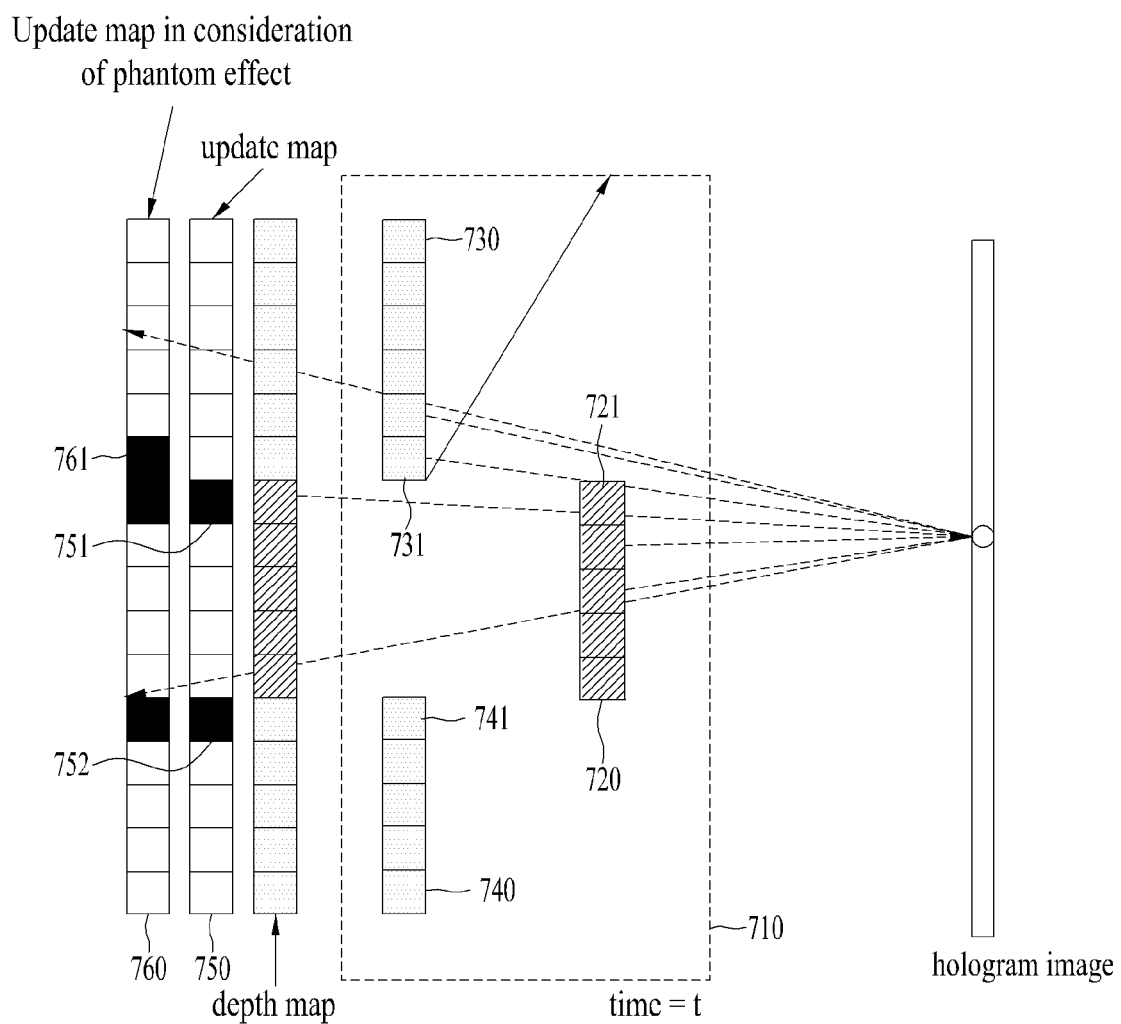
FIG. 7 is a diagram for a situation in which a hologram is synthesized at a current timing (t)

FIG. 7 is a diagram for a situation in which a hologram is synthesized at a current timing (t).

FIG. 7 shows a situation in which a hologram for a 3D image frame at a current timing (t) is synthesized.

In FIG. 7, a depth map having depth information on 3D points recorded therein and an update map indicating whether to update the 3D points are shown. 3D expression area corresponds to a box 710. And, the 3D points 720, 730 and 740 are displayed in the 3D expression area 710 according to the corresponding depth values, respectively.

Referring to FIG. 7, the update map 750 indicates the 3D points that have changed according to a motion of an object at a timing t. In the update map 750, a vacant spot means a value of 0 and a spot 751/752 filled with black color means a value of 1. The spot 751/752 indicates that the related 3D point 721/741 should be updated.

The 3D image frame at the timing t in FIG. 7 corresponds to a case that the 3D points 620 of the 3D image frame at the timing t−1 in FIG. 6 are shifted upward by one pixel in a direction parallel to X axis. In viewpoint of a user, an actually changing area in the update map corresponds to the points 751 and 752 filled with black color. Yet, a change occurs in the 3D point 731. For this reason, since the 3D point 731 is blocked by the 3D point 721, the 3D point 731 causes a phantom image effect.

The control unit 190 modifies the update map 750 to enable the 3D point 731 to be updated as well. An update map 760 is the map modified from the former update map 750. In the modified update map 760, a point 761 related to the 3D point 731 is filled with black color.

In the following description, a 3D point required to be updated due to a difference between images shall be named a difference 3D point and a 3D point to be updated in association with the difference 3D point shall be named a phantom 3D point. For instance, the 3D point 721/741 is the difference 3D point and the 3D point 731 is the phantom 3D point.

Figure 8:
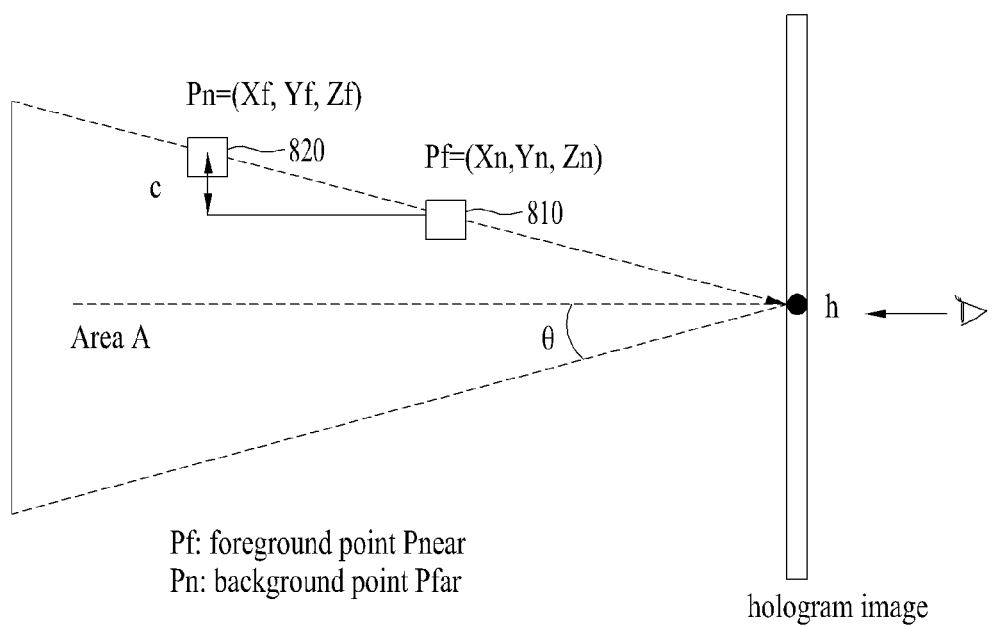
FIG. 8 is a diagram of a 3D point to be updated in association with a 3D point requested to be updated due to a difference between images.

FIG. 8 is a diagram for a 3D point to be updated in association with a 3D point required to be updated due to a difference between images.

Referring to FIG. 8, the control unit 190 is able to determine a 3D point within a prescribed distance from a difference 3D point as a phantom 3D point.

As a part of an embodiment, the control unit 190 is able to calculate a prescribed distance based on a distance C on an X-Y plane of a foreground 3D point 810 and a background 3D point 820. The foreground 3D point 810 has a depth value (Zn) of the foreground in the 3D expression area and the background 3D point 820 has a depth value (Zf) of the background in the 3D expression area in a manner of being located on the boundary of the area A. In this case, the distance C becomes a maximum distance from the background points, which may be possibly blocked by a difference 3D point. The holographic display device 100 is able to determine a 3D point within the maximum distance from the difference 3D point as a phantom 3D point. Therefore, the present invention prevents a phantom image effect without a process for searching all 3D points for a 3D point causing the phantom effect and generates a hologram without a phantom image effect more quickly.

The distance C can be extracted based on Equation 4 as follows.

$$C=\sqrt{((Xf-Xn)^2(Yf-Yn)^2)}$$ [Equation 4]

In this case, Xf and Yf indicate a coordination value on X axis and a coordination value on Y axis at a background 3D point 820, respectively. Xn and Yn indicate a coordination value on X axis and a coordination value on Y axis at a foreground 3D point 810, respectively.

As a part of an embodiment, the control unit 190 is able to determine a prescribed distance based on a value E of Equation 5 as follows.

$$E=D*\tan(\arcsin(\lambda/(2P)))$$ [Equation 5]

In this case, D is a depth value (|Zf−Zn|) of a 3D expression area, $\lambda$ is a wavelength of light used for the playback of a hologram, and P is a size of pixel of a display panel.

Figure 9:
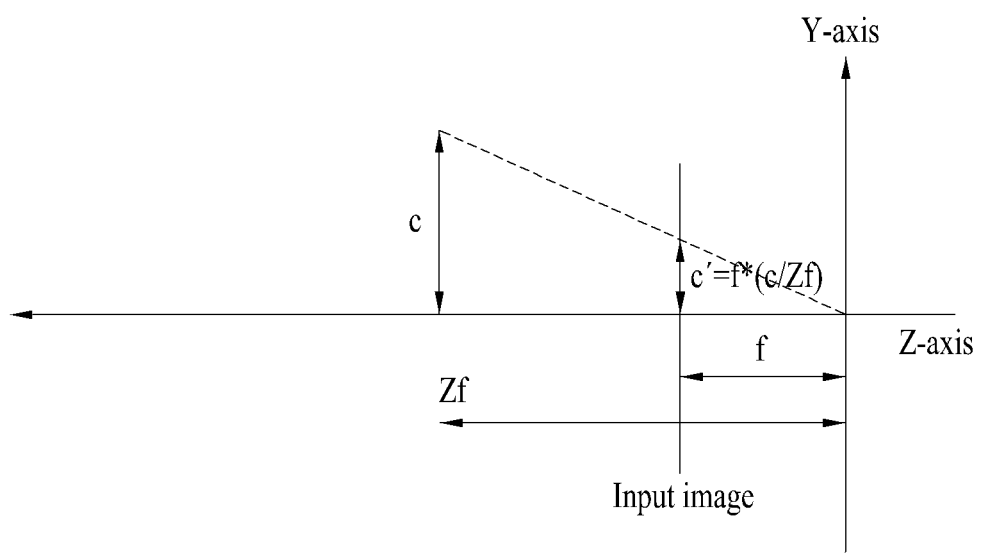
FIG. 9 is a diagram for a relationship between a distance in a 3D expression space and a distance in a 3D image frame.

FIG. 9 is a diagram for a relationship between a distance in a 3D expression space and a distance in an input image frame.

Referring to FIG. 9, a pixel distance C▯ in an image corresponding to a distance C on an X-Y plane distant from Z axis by Zf in 3D space can be represented as Equation 6.

$$C\square=f*(c/Zf)$$ [Equation 6]

In this case, 'f' is a focal distance.

In a 3D image frame, the control unit 190 is able to determine a 3D point positioned within a prescribed pixel distance from the position in the 3D image frame of a difference 3D point as a phantom 3D point. In particular, the control unit 190 is able to determine a 3D point positioned within the prescribed distance from the difference 3D point in a 2D image frame of the 3D image frame as a phantom 3D point.

As a part of an embodiment, the control unit 190 is able to determine the prescribed pixel distance based on a value Q of Equation 7 as follows.

$$Q=(f/Zf)*|Zf-Zn|*\tan(\arcsin(\lambda(2P)))$$ [Equation 7]

In this case, f is a focal distance, Zf is a depth value of a background of a 3D expression area, Zn is a depth value of a foreground of the 3D expression area, $\lambda$ is a wavelength of light used for the playback of a hologram, and P is a size of pixel of a display panel. The value Q of Equation 7 is a pixel distance in an image corresponding to the value E of Equation 5.

In Equation 7, $\lambda$ and P are constants. If Zf, Zn and f do not change, Q becomes a constant. If an update map is modified in a manner that a pixel distant by Q from a pixel represented as 1 in the update map us represented as 1, it may be able to prevent a phantom image effect.

Figure 10:
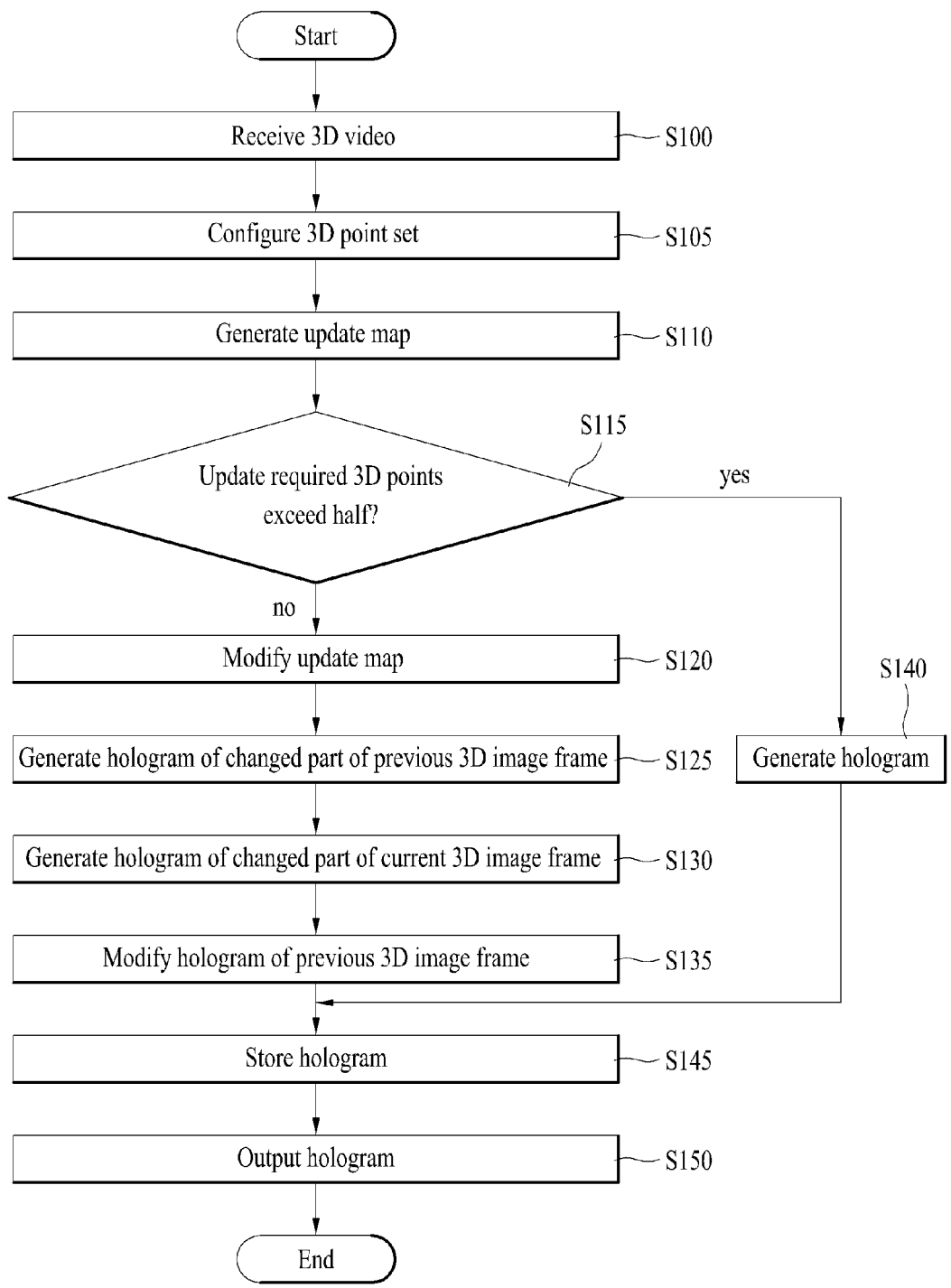
FIG. 10 is a flowchart for a method of generating a hologram according to one preferred embodiment of the present invention.

FIG. 10 is a flowchart for a method of generating a hologram according to one preferred embodiment of the present invention.

Referring to FIG. 10, the receiving unit 101 receives signals including 3D video [S100]. In this case, the received signals may include broadcast signals. The 3D video includes a plurality of 3D image frames and a plurality of the 3D image frames may include color images and depth images.

The control unit 190 configures a 3D point set based on the color and depth images included in the 3D video [S105]. The configured 3D point set can be defined by the aforementioned Equation 2. The configured 3D point set may correspond to one 3D image frame included in the 3D video.

The control unit 190 generates an update map using a current 3D image frame and a previous 3D image frame [S110]. The current 3D image frame may include a 3D image frame to be displayed currently and the previous 3D image frame may include a 3D image frame displayed previously. The update map includes information indicating 3D points which are required to be updated and can be generated by the method described with reference to FIG. 5.

As a part of an embodiment, the current 3D image frame and the previous 3D image frame correspond to the 3D image frame 520 and the 3D image frame 510 shown in FIG. 5, respectively. And the update map may include the update map 750 shown in FIG. 7.

The control unit 190 checks whether the 3D points required to be updated exceed a half of the 3D points included in a 3D image frame [S115]. As a part of an embodiment, the control unit 190 may be able to check whether a percentage of the 3D points required to be updated is equal to or greater than a preset percentage, in the step S115. In this case, the percentage of the 3D points indicates a percentage of the 3D points required to be updated for the total number of the 3D points included in the 3D image frame. And, the preset percentage may include a value in a range between 30% to 70%, and preferably, a value in a range between 40% to 60%.

If the 3D points required to be updated does not exceed the half, the control unit 190 modifies the update map to further include information indicating the update of the phantom 3D points [S120]. As a part of an embodiment, the modified update map may include the update map 760 shown in FIG. 7. The control unit 190 may be able to determine the phantom 3D point by the method described with reference to FIG. 8 or FIG. 9.

Figure 11:
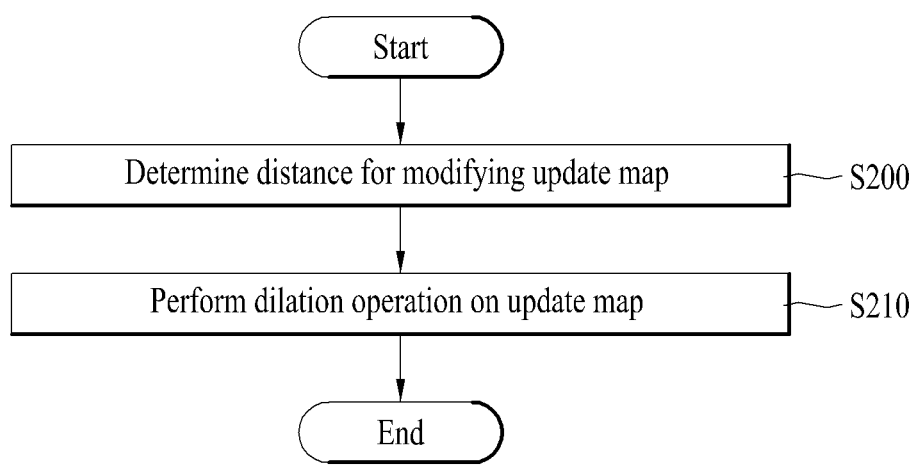
FIG. 11 is a flowchart for a method of modifying an update map according to one preferred embodiment of the present invention.
Figure 15:
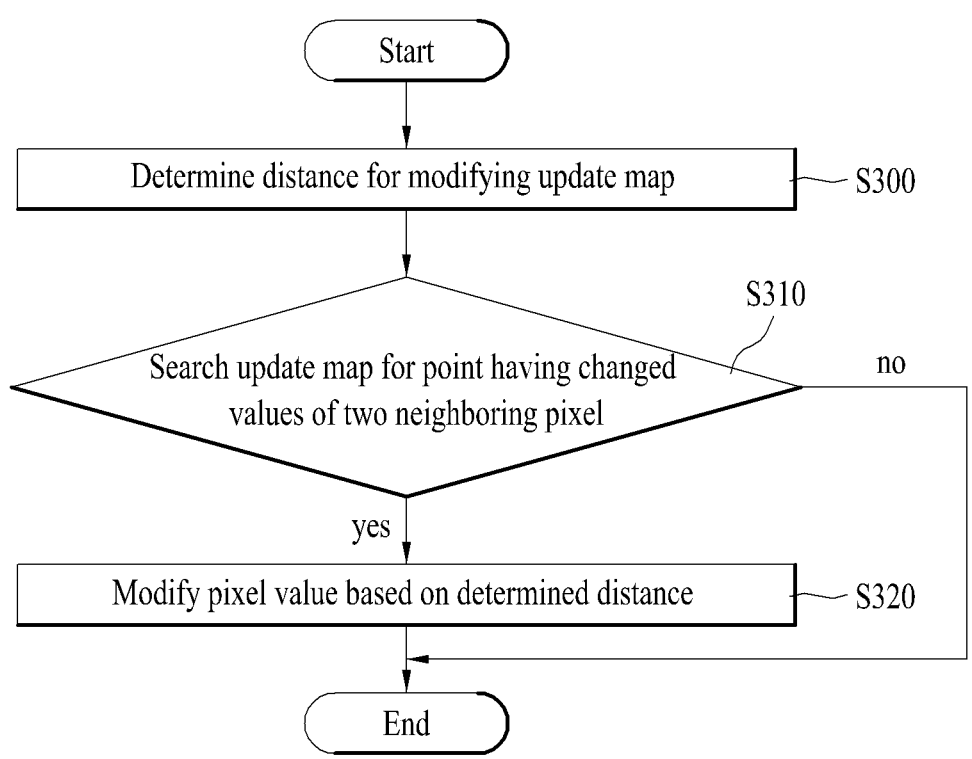
FIG. 15 is a flowchart for a method of modifying an update map according to another preferred embodiment of the present invention.

As a part of an embodiment, the step S120 may include the process shown in FIG. 11 or the process shown in FIG. 15.

The control unit 190 generates a hologram of the changed part of the previous 3D image frame using the update map modified in the step S120 [S125]. In this case, the changed part means the 3D point indicated to be updated by the modified update map.

The control unit 190 generates a hologram of the changed part of the current 3D image frame using the update map modified in the step S120 [S130]. The changed part means the 3D point indicated to be updated by the modified update map.

The control unit 190 deletes the hologram generated in the step S125 from the hologram of the previous 3D image frame and adds the hologram generated in the step S130 thereto [S135]. In particular, the control unit deletes a fringe pattern of the 3D point of the previous 3D image frame represented as 1 in the modified update map but adds a fringe pattern of a corresponding 3D point of the current 3D image frame. In other word, a hologram image is newly synthesized only for the changing 3D points (i.e., the 3D points represented as 1 in the modified update map), thereby reducing the time taken to generate a hologram image of the current 3D image frame. In this case, the control unit 190 is able to access a hologram value of the previous 3D image frame in the storage unit 180.

If the 3D points required to be updated exceed the half, the control unit 190 newly generates a hologram of the current 3D image frame using the 3D point set of the current 3D image frame configured in the step S5105 [S140].

The control unit 190 saves the hologram generated as a result of the step S135 or the step S140 in the storage unit 180 [S145].

The control unit controls the hologram generated as a result of the step S135 or the step S140 to be displayed [S150]. In this case, a hologram value of the generated hologram can be applied to the pixels of the spatial light modulator of the display unit 150.

FIG. 11 is a flowchart for a method of modifying an update map according to one preferred embodiment of the present invention.

A method of modifying an update map shown in FIG. 11 relates to a method of modifying an update map supportive of full parallax.

Referring to FIG. 11, the control unit 190 determines a distance to modify an update map [S200]. In this case, the distance may include a spatial distance between a difference 3D point and a phantom 3D point to be calculated or a pixel distance within a 3D image frame. The spatial distance can be determined based on Equation 4 and Equation 5, the pixel distance can be determined based on Equation 7.

The control unit 190 performs a dilation operation on the update map [S210]. The control unit 190 is able to use a mask having a radius set to a distance determined in the step S200 as a mask of the dilation operation. According to the dilation operation, a center pixel of the mask is positioned at each pixel of an input image and then the pixels of the input image overlapping the black color area of the mask are colored in black. The control unit 190 performs the dilation operation in a manner that the pixel represented as 1 in the update map generated in the step S110 shown in FIG. 10 is selected as an input image. By performing the dilation operation, the control unit 190 represents each pixel, of which distance from the pixel represented as 1 in the update map is smaller than the distance calculated in the step S200, as 1.

Figure 12:
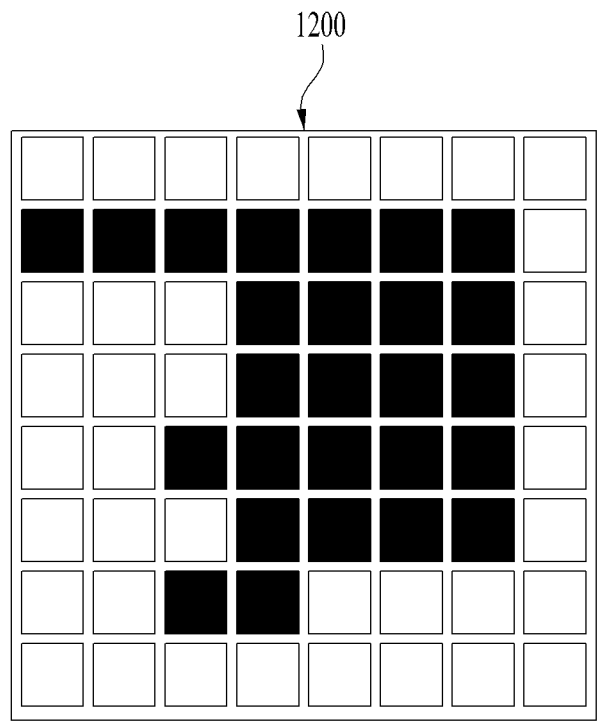
FIG. 12 is a diagram of a 3D image frame according to one embodiment.
Figure 13:
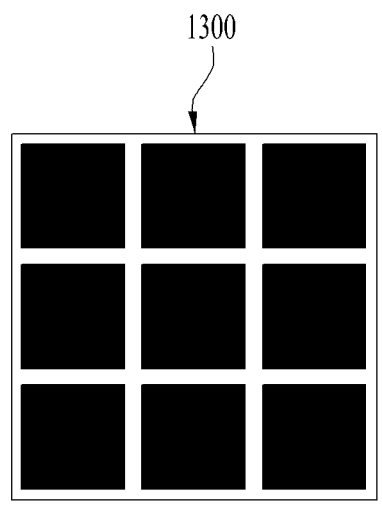
FIG. 13 a diagram of a structure element according to one embodiment.
Figure 14:
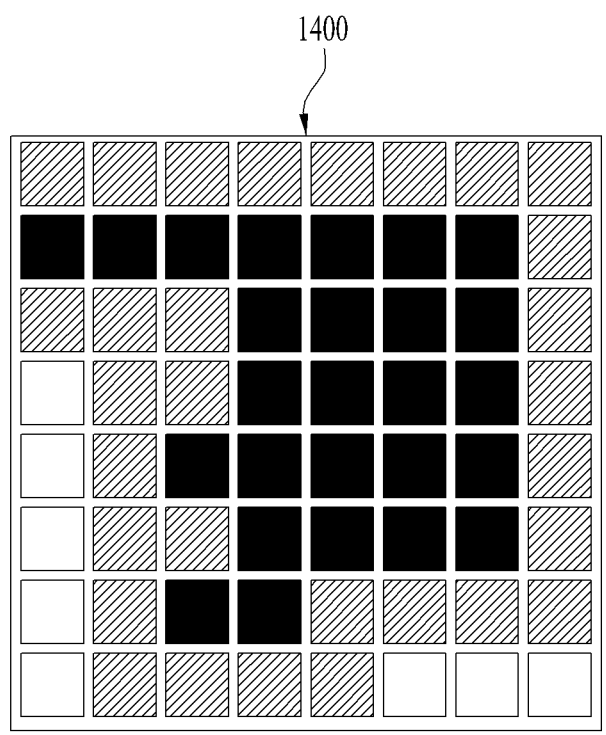
FIG. 14 is a diagram for a result of dilation calculation according to one embodiment.

FIG. 12 is a diagram of a 3D image frame according to one embodiment, FIG. 13 a diagram of a structure element according to one embodiment, and FIG. 14 is a diagram for a result of dilation calculation according to one embodiment. In particular, FIG. 14 is a diagram for a result of a dilation operation performed on an update map shown in FIG. 12.

Referring to FIGS. 12 to 14, assume that the update map generated in the step S110 shown in FIG. 10 corresponds to an update map 1200 shown in FIG. 12 and that the distance determined in the step S200 shown in FIG. 11 is a pixel distance '1'. A black pixel in the update map 1200 indicates that a 3D point related to the corresponding pixel needs to be updated and a white pixel indicates that a 3D point related to the corresponding pixel does not need to be updated.

The control unit 190 performs a dilation operation on the update map 1200 using a mask 1300 having a radius set to the pixel distance '1'. In this case, the mask 1300 corresponds to a structure element for a morphology operation shown in FIG. 13.

As a result of the dilation operation, the update map 1200 shown in FIG. 12 is modified into an update map 1400 in FIG. 14. The slashed pixels in the modified update map 1400 indicate a dilated area and also indicate an area to be modified in black. In particular, the slashed pixels in the modified update map 1400 indicate the 3D points required to be updated additionally.

FIG. 15 is a flowchart for a method of modifying an update map according to another preferred embodiment of the present invention.

The update map modifying method shown in FIG. 15 relates to a method of modifying an update map supportive of horizontal parallax.

Referring to FIG. 15, the control unit 190 determines a distance to modify an update map [S300]. In this case, the distance may include a spatial distance between a difference 3D point and a phantom 3D point to be calculated or a pixel distance within a 3D image frame. The spatial distance can be determined based on Equation 4 and Equation 5 and the pixel distance can be determined based on Equation 7.

The control unit 190 retrieves a case that the values of two neighboring pixels are changed in the update map [S310]. As a part of an embodiment, assuming that a pixel value indicating an update of a 3D point is represented as 1 in the update map and that a pixel value not indicating an update of a 3D point is represented as 0 in the update map, the control unit 190 is able to retrieve a case that the values of two neighboring pixels are changed into '01' or '10', in the step S310.

In case that the values of the two neighboring pixels are changed, the control unit 190 modifies the pixel value based on the distance determined in the step S300 [S320]. The control unit 190 changes the pixels, which are situated within the determined distance in direction from one pixel having the pixel value indicating the update to another pixel, to have the pixel value indicating the update.

A holographic display device and operating method thereof according to the present invention are non-limited by the configurations and methods of the embodiments mentioned in the foregoing description. The embodiments may be reconfigured in a manner of being selectively combined entirely or in part to make various modifications.

Accordingly, the present invention may provide the following effects and/or features.

According to the holographic display device and method for generating hologram using redundancy of 3D video of the present invention, since one 3D point blocked by another 3D point updated in generating a hologram using redundancy of 3D video is updated together, it may be able to prevent an occurrence of a phantom image effect. And, by updating 3D points situated within a prescribed distance centering on a 3D point without applying the phantom image removal method to all 3D points, it may be able to generate hologram without the phantom image effect more quickly.

Meanwhile, a method of operating a holographic display device according to the present invention can be implemented with processor-readable codes in a recording medium that can be read by a processor provided to the holographic display device. The processor-readable recording medium may include at least one of all kinds of recording devices capable of storing processor-readable data. For example, the processor-readable recording medium may include one of a ROM, a RAM, a CD-ROM, a magnetic tape, a floppy disc, an optical data storing device and the like and may further include such an implementation in a carrier wave form as a transmission via internet and the like. Moreover, as the processor-readable recording medium is distributed to a computer system connected via a network, the processor-readable codes can be saved and executed by a distributive system.

While the present invention has been described and illustrated herein with reference to the preferred embodiments thereof, the present invention is not limited to the aforementioned specific embodiment. It will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of generating a hologram using redundancy of 3D video, the method comprising:
    generating an update map indicating an update required 3D point among 3D points contained in a current 3D image frame based on the current 3D image frame and a previous 3D image frame;
    determining a pixel distance to determine the related 3D point;

modifying the update map to further contain information indicating an update of a 3D point related to the update required 3D point by performing a dilation operation on the generated update map using a mask having a radius set to the determined pixel distance; and generating the hologram of the current 3D image frame based on the modified update map, wherein the dilation operation is that a center pixel of the mask is positioned at each pixel of an input image and then the pixels of the input image overlapping the black color area of the mask are colored in black.

2. The method of claim 1, wherein the related 3D point comprises at least one of a 3D point causing a phantom image due to the update required 3D point and a 3D point blocked by the update required 3D point.

3. The method of claim 1, wherein the related 3D point is situated within a prescribed distance from the update required 3D point.

4. The method of claim 3, wherein the prescribed distance is determined based on a value C of the following Equation:

$$C=D*\tan(\arcsin(\lambda/(2P))),$$

where the D is a depth value of a 3D expression area, the $\lambda$ is a wavelength of light used for a playback of the hologram, and the P is a size of a pixel of a display panel.

5. The method of claim 1, wherein the related 3D point is situated within a prescribed pixel distance from a position of the update required 3D point.

6. The method of claim 5, wherein the prescribed pixel distance is determined based on a value Q of a following Equation:

$$Q=(f/Zf)*|Zf-Zn|*\tan(\arcsin(\lambda/(2P))),$$

where the f is a focal distance, the Zf is a depth value of a background of a 3D expression area, the Zn is a depth value of a foreground of the 3D expression area, the $\lambda$ is a wavelength of light used for a playback of the hologram, and the P is a size of a pixel of a display panel.

7. The method of claim 1, wherein generating the hologram comprises:

checking whether a percentage of the update required 3D point exceeds a preset percentage using the generated update map;

modifying the hologram of the previous 3D image frame based on the modified update map if the percentage of the update required 3D point does not exceed the preset percentage; and outputting the modified hologram as the hologram of the current 3D image frame.

8. The method of claim 7, wherein generating the hologram further comprises:

newly generating the hologram of the current 3D image frame if the percentage of the update required 3D point exceeds the preset percentage.

9. The method of claim 1, wherein modifying the update map comprises:

checking whether a point having a changed value between two neighboring pixels in the generated update map exists; and if the changed point exists, modifying information included in a pixel within a determined pixel distance from a pixel including the 3D point update indicating information of the two neighboring pixels into the 3D point update indicating information.

10. The method of claim 1, wherein the 3D image frame comprises a 2D image frame containing color image data and a depth image data containing a depth value of a pixel contained in the 2D image frame.

11. A holographic display device comprising:

a storage unit configured to store a hologram of a previous 3D image frame; and a control unit configured to:

generate an update map indicating an update required 3D point among 3D points contained in a current 3D image frame based on the current 3D image frame and a previous 3D image frame, modify the update map to further include information indicating an update of a 3D point related to the update required 3D point by performing a dilation operation on the generated update map using a mask having a radius set to the determined pixel distance, and generate the hologram of the current 3D image frame based on the modified update map, wherein the dilation operation is that a center pixel of the mask is positioned at each pixel of an input image and then the pixels of the input image overlapping the black color area of the mask are colored in black.

12. The holographic display device of claim 11, wherein the related 3D point corresponds to at least one of a 3D point causing a phantom image due to the update required 3D point and a 3D point blocked by the update required 3D point.

13. The holographic display device of claim 11, wherein the related 3D point is situated within a prescribed distance from the update required 3D point.

14. The holographic display device of claim 13, wherein the prescribed distance is determined based on a value C of a following Equation:

$$C=D*\tan(\arcsin(\lambda/(2P))),$$

where the D is a depth value of a 3D expression area, the $\lambda$ is a wavelength of light used for a playback of the hologram, and the P is a size of a pixel of a display panel.

15. The holographic display device of claim 11, wherein the related 3D point is situated within a prescribed pixel distance from the update required 3D point.

16. The holographic display device of claim 15, wherein the prescribed pixel distance is determined based on a value Q of a following Equation:

$$Q=(f/Zf)*|Zf-Zn|*\tan(\arcsin(\lambda/(2P))),$$

where the f is a focal distance, the Zf is a depth value of a background of a 3D expression area, the Zn is a depth value of a foreground of the 3D expression area, the $\lambda$ is a wavelength of light used for a playback of the hologram, and the P is a size of a pixel of a display panel.

17. The holographic display device of claim 11, wherein the control unit checks whether a percentage of the update required 3D point exceeds a preset percentage using the generated update map, wherein the control unit modifies the hologram of the previous 3D image frame based on the modified update map if the percentage of the update required 3D point does not exceed the preset percentage, and wherein the control unit outputs the modified hologram as the hologram of the current 3D image frame.

18. The holographic display device of claim 17, wherein the control unit newly generates the hologram of the current 3D image frame if the percentage of the update required 3D point exceeds the preset percentage.

19. The holographic display device of claim 11, further comprising:

a display unit configured to display the hologram of the current 3D image frame, the display unit comprising:
a spatial light modulator configured to represent an interference fringe of the hologram of the current 3D image frame; and
a light source configured to apply a light to the spatial light modulator.

* * * * *